US009281135B2

(12) United States Patent
Soneda et al.

(10) Patent No.: US 9,281,135 B2
(45) Date of Patent: Mar. 8, 2016

(54) NITROGEN-CONTAINING POROUS CARBON MATERIAL AND METHOD OF PRODUCING THE SAME, AND ELECTRIC DOUBLE-LAYER CAPACITOR USING THE NITROGEN-CONTAINING POROUS CARBON MATERIAL

(75) Inventors: Yasushi Soneda, Tsukuba (JP); Masaya Kodama, Tsukuba (JP); Takahiro Morishita, Osaka (JP)

(73) Assignees: National Institute of Advanced Industrial Science and Technology, Tokyo (JP); Toyo Tanso Co., Ltd., Osaka-shi (JP)

( * ) Notice: Subject to any disclaimer, the term of this patent is extended or adjusted under 35 U.S.C. 154(b) by 491 days.

(21) Appl. No.: 13/512,517

(22) PCT Filed: Nov. 26, 2010

(86) PCT No.: PCT/JP2010/071135
§ 371 (c)(1),
(2), (4) Date: Jun. 18, 2012

(87) PCT Pub. No.: WO2011/065484
PCT Pub. Date: Jun. 3, 2011

(65) Prior Publication Data
US 2012/0241691 A1    Sep. 27, 2012

(30) Foreign Application Priority Data
Nov. 30, 2009    (JP) .................................. 2009-272409

(51) Int. Cl.
| H01B 1/04 | (2006.01) |
| H01G 11/32 | (2013.01) |
| H01G 11/34 | (2013.01) |
| C01B 21/06 | (2006.01) |
| C01B 31/02 | (2006.01) |
| H01G 11/44 | (2013.01) |

(52) U.S. Cl.
CPC ............ *H01G 11/34* (2013.01); *C01B 21/0605* (2013.01); *C01B 31/02* (2013.01); *H01G 11/32* (2013.01); *H01G 11/44* (2013.01); *C01P 2006/12* (2013.01); *Y02E 60/13* (2013.01)

(58) Field of Classification Search
None
See application file for complete search history.

(56) References Cited

U.S. PATENT DOCUMENTS

| 5,242,879 A * | 9/1993 | Abe .................... B01J 20/20 |
| | | 210/756 |
| 2010/0209823 A1* | 8/2010 | Ko ..................... H01M 8/0234 |
| | | 429/532 |
| 2014/0113200 A1* | 4/2014 | Seymour ................ H01G 11/38 |
| | | 429/231.8 |

FOREIGN PATENT DOCUMENTS

| JP | 05254954 A * | 10/1993 |
| JP | 2004-168587 A | 6/2004 |
| JP | 2005-239456 A | 9/2005 |
| JP | 2006-124250 A | 5/2006 |
| JP | 2007-269505 A | 10/2007 |
| JP | 2008-13394 A | 1/2008 |
| JP | 2008-21833 A | 1/2008 |
| JP | 2008-239418 A | 10/2008 |
| JP | 2009-269764 A | 11/2009 |
| JP | 2009-269765 A | 11/2009 |
| WO | WO 2008/126799 A1 | 10/2008 |

OTHER PUBLICATIONS

Setoyama et al. (JP 2004-168587 A) English text machine translation accessed on the AIPN JPO website, attached as a PDF.*
Asami et al. (JP 2009 269764) English text machine translation accessed on the AIPN JPO website, attached as a PDF.*
English text abstract for JP 05-254954 A to Yamazaki et al.*
PCT/ISA/210—International Search Report mailed Mar. 1, 2011, issued in PCT/JP2010/071135.
Yasushi Soneda et al.: "Synthesis of nitrogen enriched porous carbons using magnesium citrate template and its use for the electric double layer capacitor", Abstracts of The 36th Annual Meeting of the Carbon Society of Japan, Cover, pp. 12-13, and Colophon, Dec. 1, 2009.
Japanese Office Action dated Mar. 18, 2014, issued in corresponding Japanese Patent Application No. 2009-272409.

* cited by examiner

*Primary Examiner* — Khanh Tuan Nguyen
*Assistant Examiner* — Katie L Hammer
(74) *Attorney, Agent, or Firm* — Birch, Stewart, Kolasch & Birch, LLP

(57) ABSTRACT

A nitrogen-containing carbon porous material, which has a nitrogen content of 0.5 to 30 mass %, and which has a specific surface area of 200 to 3,000 m²/g.

10 Claims, No Drawings

NITROGEN-CONTAINING POROUS CARBON MATERIAL AND METHOD OF PRODUCING THE SAME, AND ELECTRIC DOUBLE-LAYER CAPACITOR USING THE NITROGEN-CONTAINING POROUS CARBON MATERIAL

TECHNICAL FIELD

The present invention relates to a nitrogen-containing (or nitrogen-enriched) porous carbon material and a method of producing the same, and an electric double-layer capacitor using the nitrogen-containing porous carbon material in an electrode.

BACKGROUND ART

Electric double-layer capacitors (ELDCs) are large in electrostatic capacity, and excellent in charge/discharge cycle characteristics, and thus they are used as backup power sources in various equipments, including automobiles. For the ELDCs, use may be made of a polarizable electrode obtained by forming an active carbon with a binder resin, such as polytetrafluoroethylene, into a sheet form.

As a method of producing the active carbon used in the polarizable electrode, a method is proposed which method includes: mixing magnesium salt of an organic acid or the like, as a template, with an organic substance which is to be a carbon precursor, calcinating the resultant mixture, to prepare a composite of carbon and magnesium oxide (MgO), and removing the MgO template by elusion by treating the composite with an acid, thereby preparing a porous carbon (see Patent Literature 1). However, by this method, it is not possible to produce a nitrogen-containing porous carbon material in which nitrogen is made into a solid solution in the thus-prepared carbon skeleton.

Nitrogen-containing carbon materials are more suitable as electrode materials for EDLCs, and a nitrogen-containing carbon material is known which is prepared by using a polymer high in a nitrogen content, such as a melamine resin, as a raw material. Patent Literature 2 describes a method of producing a nitrogen-containing carbon using a swellable fluorine mica as a template, and a melamine resin and/or an acrylonitrile resin. Further, Patent Literature 3 proposes a method of producing a nitrogen-containing carbon by carbonization of a melamine resin foam.

In accordance with the demand for increasing the capacity of EDLCs, it is desired to increase the surface area of the nitrogen-containing porous carbon material, but a sufficient one has not been obtained by the above-mentioned methods. Further, since a melamine monomer that is a raw material of a melamine resin sublimates by a heat treatment, this is not directly used as a raw material for a nitrogen-containing porous carbon material. As a result, it is difficult to readily produce a nitrogen-containing porous carbon material.

CITATION LIST

Patent Literature

Patent Literature 1: JP-A-2008-13394 ("JP-A" means unexamined published Japanese patent application)
Patent Literature 2: JP-A-2005-239456
Patent Literature 3: JP-A-2007-269505

SUMMARY OF INVENTION

Technical Problem

The present invention is contemplated for providing a nitrogen-containing porous carbon material that can be produced by using a melamine as a direct raw material and that shows excellent properties as an electrode material for an electric double-layer capacitor, and for providing a high-capacity electric double-layer capacitor using the same.

Solution to Problem

According to the present invention, there is provided the following means:

(1) A nitrogen-containing carbon porous material, which has a nitrogen content of 0.5 to 30 mass %, and which has a specific surface area of 200 to 3,000 $m^2/g$.
(2) The nitrogen-containing carbon porous material according to (1), which is obtained by mixing a melamine and magnesium citrate, heating the resultant mixture to 700° C. or more under an inert atmosphere, followed by cooling and washing with an acid.
(3) An electrode material for an electric double-layer capacitor, which is formed by binding the nitrogen-containing carbon porous material according to (1) or (2) with a binder resin.
(4) An electric double-layer capacitor, which is formed with the electrode material for an electric double-layer capacitor according to (3) in an electrode.
(5) A method of producing a nitrogen-containing carbon porous material, comprising the steps of: mixing a melamine and magnesium citrate; heating the resultant mixture to 700° C. or more under an inert atmosphere; cooling; and washing with an acid.
(6) The method of producing a nitrogen-containing carbon porous material according to (5), wherein a temperature rising speed to a retention temperature of 700° C. or more is from 1 to 100° C./min.
(7) The method of producing a nitrogen-containing carbon porous material according to (5) or (6), wherein a retention time period at 700° C. or more is from 1 to 5,000 min.

The "specific surface area" in the present invention means one obtained by measuring by a BET method, and the nitrogen content means a value in terms of mass % (in terms of dry and ash-free) obtained by a combustion analysis.

Other and further features and advantages of the invention will appear more fully from the following description.

Advantageous Effects of Invention

According to the present invention, it becomes possible to produce a nitrogen-containing porous carbon material, from a melamine, which was difficult to be carbonized with the conventional technique, as a raw material of a carbon material for an electrode, by using magnesium citrate as a template. The nitrogen-containing porous carbon material shows excellent properties as an electrode for an electric double-layer capacitor using an aqueous solution electrolyte, owing to the high surface area and the function of the nitrogen in the material. The electric double-layer capacitor using the nitrogen-containing porous carbon material of the present invention has a high capacity.

MODE FOR CARRYING OUT THE INVENTION

The nitrogen-containing porous carbon material of the present invention can be produced, by heating magnesium citrate and a melamine under an inert atmosphere, followed by cooling and washing with an acid. Upon this heating, the Mg in the magnesium citrate is oxidized to form fine magnesium oxide (MgO), and a carbon film containing the nitrogen derived from the melamine is formed at the circumference of a particle of the MgO. By removing the MgO from the resultant product by washing the MgO with a solution of a soluble acid, such as sulfuric acid and hydrochloric acid, a nitrogen-containing carbon film having pores on the inside thereof remains, which becomes the nitrogen-containing porous carbon material.

As the melamine that can be used as a raw material in the present invention, melamine monomers, as well as melamine oligomers (for example, dimers to decamers) can be used (in the present invention, these are collectively referred to as a melamine). The melamine generally sublimates by heating and does not leave any carbon residue. However, in the present invention, the melamine forms a carbon porous material containing nitrogen on a carbon skeleton, by mixing the melamine with magnesium citrate and heating the resultant mixture. The reason is presumed that the fine MgO particles generated have an effect of accelerating the polymerization of the melamine by the magnesium citrate that functions as a template, and that a gas component generated by the decomposition of the magnesium citrate reacts with the melamine to form a polymerization product.

Since magnesium citrate ($Mg_3(C_6H_5O_7)_2 \cdot 9H_2O$) generates 19.7 mass % of MgO, the mixing ratio of the melamine and magnesium citrate may be more than 0 (parts by mass) and less than 10 (parts by mass) of the melamine when 19.7% of the weighed value (g) of the magnesium citrate is converted to the mass of MgO and the sum of the mass of the MgO and the weighed value of the melamine (g) is defined as 10 (parts by mass), and preferably, the ratio of melamine:magnesium citrate is from 1:9 to 9:1 (parts by mass).

The heating temperature is preferably 700° C. or more, more preferably from 800° C. to 1,000° C. By heating to such a temperature, the thermal decomposition of the raw materials proceeds, and the crystallization of the nitrogen-containing carbon proceeds. Further, an electrical resistance suitable for an electrode for an electric double-layer capacitor can be obtained, which is also advantageous for the homogenization of the pores in the carbon skeleton.

The temperature rising speed to the above-mentioned temperature is preferably from 1 to 100° C./min, more preferably from 5 to 20° C./min. In such a temperature rising speed, thermal decomposition proceeds stably and crystallization proceeds more favorably.

Further, the above-mentioned temperature is retained for a time period of preferably from 1 to 5,000 min, more preferably from 30 to 300 min. By this retention time period, elimination of light elements in the nitrogen-containing carbon proceeds, which makes it possible to control the composition and specific surface area of the thus-obtained nitrogen-containing porous carbon material.

The reaction atmosphere at that reaction is conducted under an inert atmosphere, such as under a nitrogen atmosphere.

The nitrogen-containing porous carbon material of the present invention has a specific surface area of from 200 to 3,000 $m^2/g$, preferably from 600 to 2,200 $m^2/g$. Further, the content of nitrogen is from 0.5 to 30 mass %, preferably from 0.5 to 20 mass %.

Since the nitrogen-containing carbon porous material of the present invention is high in the ratio of mesopores of 2 to 50 nm in the pores thereof and has many of such pores, it is advantageous for the penetration of an electrolyte solution and the migration of ions and is favorable in the rate property, when it is formed into an electrode for an electric double-layer capacitor. Further, it can be formed into an electrode for a capacitor high in the specific capacity.

The electrode for an electric double-layer capacitor of the present invention is obtained by binding the above-mentioned nitrogen-containing carbon porous material with a binder resin and forming into a shape of a sheet or the like. As the binder resin, use may be made of usually-used ones, such as polytetrafluoroethylene (PTFE). At this time, a suitable amount of carbon black or the like can be added. The shape of the electrode is not specifically limited.

The electric double-layer capacitor of the present invention is similar to a conventional electric double-layer capacitor, except that the above-mentioned electrode for an electric double-layer capacitor is used. Specifically, the electric double-layer capacitor may be one, in which the above-mentioned electrodes for an electric double-layer capacitor are provided so that they oppose to each other via a separator, and these electrodes are impregnated into a respective electrolyte solution, to act as an anode and a cathode, respectively.

EXAMPLES

The present invention will be described in more detail based on examples given below, but the invention is not meant to be limited by these.

Examples 1 and 2, Comparative Examples 1 and 2

Preparation of Carbon Porous Material (1) Predetermined amounts of magnesium citrate (trimagnesium dicitrate nonahydrate, $Mg_3(C_6H_5O_7)_2 \cdot 9H_2O$) and melamine ($C_3H_6N_6$) were weighed, and mixed in an agate mortar so that they became sufficiently homogeneous. The mixing ratio was as shown in Table 1.

(2) The thus-mixed powder of raw materials was filled in a quartz boat, followed by setting in a horizontal tubular electric furnace equipped with a quartz reaction tube, and heating to 800° C. at a temperature rising speed of 10° C./min by a programmable temperature controller. After retaining at 800° C. for 1 hour, the reaction product was cooled naturally, to give a calcined sample. In the reaction time period, high purity nitrogen (99.9999% or more) was passed through the reaction atmosphere.

(3) The calcined sample obtained by the above-mentioned procedures was treated with an excess amount of 6M hydrochloric acid for 15 hours or more, followed by washing with pure water, filtering and drying, to remove the MgO particles in the calcined sample.

(4) The specific surface area of the sample was determined by a BET method from a nitrogen adsorption isothermal line at 77K measured by an automated nitrogen adsorption measuring apparatus. The results are shown in Table 1.

(5) The elemental composition was quantified by a combustion method with a CHN elemental analyzer. The results are shown in Table 1.

TABLE 1

|  | Mixing ratio (mass part) | | Carbon yield (%) | Specific surface area (m²/g) | Elemental analysis value (in terms of dry & ash-free, mass %) | | | O (residue) |
|---|---|---|---|---|---|---|---|---|
|  | Melamine | Mg citrate |  |  | C | H | N |  |
| Comp. Ex. 1 | 10 | 0 | 0.0 | — | — | — | — | — |
| Ex. 1 | 7 | 3 | 42.4 | 1,015 | 73.7 | 1.5 | 13.4 | 11.4 |
| Ex. 2 | 3 | 7 | 32.7 | 2,014 | 89.2 | 0.9 | 1.2 | 8.7 |
| Comp. Ex. 2 | 0 | 10 | 32.6 | 2,182 | 93.1 | 0.9 | 0.0 | 6.0 |

Melamine: $C_3H_6N_6$ molecular weight 126.12
Magnesium citrate: trimagnesium dicitrate nonahydrate: $Mg_3(C_6H_5O_7)_2 \cdot 9H_2O$ molecular weight 613.26
Comparative example is abbreviated to 'Comp. Ex.', and Example is abbreviated to 'Ex.'

Since magnesium citrate ($Mg_3(C_6H_5O_7)_2.9H_2O$) generates MgO in an amount of 19.7 mass %, the mixing ratio (parts by mass) in Table 1 was represented by the respective value obtained when 19.7% of the weighed value (g) of the magnesium citrate was converted to the mass of MgO and the sum of the mass of the MgO and the weighed value of the melamine (g) was defined as 10 (parts by mass). The carbon yield is the ratio of the mass of the thus-obtained carbon sample to the mass of the carbon in the raw materials (melamine+Mg citrate).

In the case where only melamine was used (Comparative Example 1), since the melamine sublimated (melting point: 354° C.), the sample did not generate any carbon by the heat treatment.

In Examples 1 and 2, the carbon yield exceeded the value in the case where only magnesium citrate was used in Comparative Example 2, which shows that carbon derived from both precursors (melamine and magnesium citrate) was generated by co-carbonization.

As shown in the above-mentioned procedures, by only the cancination of the precursors and the acid treatment, in Examples 1 and 2, porous carbon materials were obtained each of which had a large specific surface area that was not less than the specific surface area (generally from about 800 to 1,000 m²/g) of a general-purpose active carbon.

It is shown from the elemental analysis that the porous carbon materials of Examples 1 and 2, which were obtained from the precursor obtained by mixing melamine and magnesium citrate, contained nitrogen.

Electrochemical Evaluation 10 mg of any of the samples of the carbon porous materials shown in Table 1 (Examples 1 and 2, and Comparative Example 2) was weighed, acetone was added dropwise thereto together with 10 mass % of PTFE (polytetrafluoroethylene) and 10 mass % of carbon black, the resultant mixture was kneaded, and a disc-shaped pellet with diameter 1 cm and thickness about 0.4 mm was prepared by using a tabletting machine. The thus-formed respective pellet was dried in vacuum at 100° C. for 1 hour, followed by cooling and then weighing immediately to give an electrode mass. The pellet was sandwiched between Teflon (registered trademark) jigs together with a platinum mesh (a current collector material) and a glass fiber filter paper (pore diameter: 1 μm), to constitute an operation electrode. A platinum plate was utilized as a counter electrode, and silver/silver chloride was utilized as a reference electrode. 1 mol/L sulfuric acid electrolyte solution was filled in a measurement cell that had been vacuumized in a container. During the electrochemical measurement, nitrogen gas was bubbled to remove dissolved oxygen. The mass ratio capacity per single electrode was determined by cyclic voltammetry (CV) and constant current charge/discharge measurement (GC).

The constant current charge/discharge was conducted in accordance with the specification of the Electronic Industries Association of Japan (EIAJ RC-2377), and a specific capacity was calculated from the discharge curve of the 5th charge/discharge cycle.

The measurement by cyclic voltammetry (CV) was conducted by using VMP-01 (trade name, manufactured by Biologic). The measurement by constant current charge/discharge measurement (GC) was conducted by using VMP-01 (trade name, manufactured by Biologic).

For comparison, a specific capacity was calculated from the half of the voltammogram area at the 5th cycle and the electrode mass, by cyclic voltammetry (0 to 1 V vs Ag/AgCl, 1 mV/s).

The results are shown in Table 2.

Both of the electrodes of Examples 1 and 2 showed a high specific capacity, and they have excellent properties when they are used in an electric double-layer capacitor.

For example, a literature (Electrochimica Acta 50 (2005) 1197-1206) shows specific capacities of 22 to 164 F/g for 12 kinds of active carbons, and it is understood that the results of the examples according to the present invention are excellent, as compared to these specific capacities.

In Example 2 (melamine:magnesium citrate=3:7), a specific capacity (F/g) was obtained which was larger than that in the case of only magnesium citrate (Comparative Example 2).

Further, the specific capacities (F/m²) of Example 1 and Example 2 exceed the value of Comparative Example 2, which shows the excellent property of the nitrogen in the nitrogen-containing porous carbon materials.

TABLE 2

|  | Constant current charge/discharge (mA/g) | | | Cyclic voltammogram |
|---|---|---|---|---|
|  | 50 | 100 | 1,000 | (1 mV/s) |
| Ex. 1 | 289 | 281 | 189 | 230 |
| Ex. 2 [F/g] | 418 | 417 | 396 | 323 |
| Ex. 1 | 0.28 | 0.28 | 0.19 | 0.23 |
| Ex. 2 [F/m²] | 0.21 | 0.21 | 0.20 | 0.16 |
| Comp. Ex. 2 | 0.17 | 0.17 | 0.16 | 0.13 |

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-272409 filed in Japan on Nov. 30, 2009, which is entirely herein incorporated by reference.

The invention claimed is:

1. A nitrogen-containing carbon porous material, comprising nitrogen at a content of 0.5 to 30 mass %, wherein the nitrogen-containing porous material has a specific surface area of 1,015 to 2,200 m²/g and contains oxygen at a content of 8.7 to 11.4 mass %,
wherein the nitrogen-containing carbon porous material is obtained by mixing and heating a melamine and magnesium citrate to form a carbon film containing the nitrogen on a carbon skeleton at a circumference of a particle of MgO formed by oxidation of Mg in the magnesium citrate upon heating, and then removing the MgO.

2. The nitrogen-containing carbon porous material according to claim 1, wherein the mixing and heating a melamine and magnesium citrate comprises mixing the melamine and magnesium citrate, and heating a resultant mixture to 700° C. or more under an inert atmosphere, followed by cooling and washing with an acid.

3. An electrode material for an electric double-layer capacitor, which is formed by binding the nitrogen-containing carbon porous material according to claim 1 with a binder resin.

4. An electric double-layer capacitor, which is formed with the electrode material for an electric double-layer capacitor according to claim 3 in an electrode.

5. An electrode material for an electric double-layer capacitor, which is formed by binding the nitrogen-containing carbon porous material according to claim 2 with a binder resin.

6. An electric double-layer capacitor, which is formed with the electrode material for an electric double-layer capacitor according to claim 5 in an electrode.

7. A method of producing the nitrogen-containing carbon porous material according to claim 1, comprising the steps of: mixing a melamine and magnesium citrate; heating the resultant mixture to 700° C. or more under an inert atmosphere; cooling; and washing with an acid.

8. The method of producing a nitrogen-containing carbon porous material according to claim 7, wherein a retention time period at 700° C. or more is from 1 to 5,000 min.

9. The method of producing a nitrogen-containing carbon porous material according to claim 7, wherein a temperature rising speed to a retention temperature of 700° C. or more is from 1 to 100° C./min.

10. The method of producing a nitrogen-containing carbon porous material according to claim 9, wherein a retention time period at 700° C. or more is from 1 to 5,000 min.

* * * * *